US008305965B2

(12) United States Patent
Shen et al.

(10) Patent No.: US 8,305,965 B2
(45) Date of Patent: *Nov. 6, 2012

(54) PROTOCOL STACK AND SCHEDULER FOR L3 RELAY

(75) Inventors: Zukang Shen, Allen, TX (US); Pierre Bertrand, Antibes (FR); Sandeep Bhadra, Addison, TX (US); Eko N. Onggosanusi, Allen, TX (US); Anthony Ekpenyong, Dallas, TX (US); Tarik Muharemovic, Forest Hills, NY (US)

(73) Assignee: Texas Instruments Incorporated, Dallas, TX (US)

( * ) Notice: Subject to any disclaimer, the term of this patent is extended or adjusted under 35 U.S.C. 154(b) by 337 days.

This patent is subject to a terminal disclaimer.

(21) Appl. No.: 12/683,300

(22) Filed: Jan. 6, 2010

(65) Prior Publication Data

US 2010/0272007 A1 Oct. 28, 2010

Related U.S. Application Data

(60) Provisional application No. 61/142,770, filed on Jan. 6, 2009, provisional application No. 61/142,771, filed on Jan. 6, 2009, provisional application No. 61/173,032, filed on Apr. 27, 2009.

(51) Int. Cl.
*H04B 7/14* (2006.01)
*H04W 00/00* (2006.01)
*H04Q 7/20* (2006.01)

(52) U.S. Cl. ........ 370/328; 370/315; 370/329; 370/348; 455/17; 455/450; 375/260

(58) Field of Classification Search .......... 370/253–349; 455/42–561, 17; 375/260–356
See application file for complete search history.

(56) References Cited

U.S. PATENT DOCUMENTS

| | | | |
|---|---|---|---|
| 2004/0062214 A1* | 4/2004 | Schnack et al. | 370/315 |
| 2007/0265013 A1* | 11/2007 | Labedz | 455/450 |
| 2009/0010238 A1* | 1/2009 | Barak et al. | 370/342 |
| 2009/0191882 A1* | 7/2009 | Kovacs et al. | 455/450 |
| 2009/0196177 A1* | 8/2009 | Teyeb et al. | 370/231 |
| 2009/0323621 A1* | 12/2009 | Touboul et al. | 370/329 |

* cited by examiner

*Primary Examiner* — Afsar M Qureshi
(74) *Attorney, Agent, or Firm* — Ronald O. Nerrings; Wade James Brady, III; Frederick J. Telecky, Jr.

(57) ABSTRACT

This invention is a method for extending the coverage and/or improving the capacity of wireless communication networks comprising inserting a Relay Node (RN) in the Radio Access Network (RAN). The relay node relays the signal between the Base Station node (eNB) and the User Equipment (UE). The relay node is wirelessly connected to the base station. The base station uses the same radio access technology (RAT) for the base station to user equipment link and the base station to relay node link. The relay node uses the same radio access technology for the base station to relay node link and the relay node to user equipment link. The relay node is non-transparent and seen as base station by the user equipment.

17 Claims, 5 Drawing Sheets

FIG. 1

(Prior Art)

PROTOCOL STACK AND SCHEDULER FOR L3 RELAY

CLAIM OF PRIORITY

This application claims priority under 35 U.S.C. 119(e)(1) to U.S. Provisional Application Nos. 61/142,770 and 61/142,771 filed Jan. 6, 2009 and U.S. Provisional Application No. 61/173,032 filed Apr. 27, 2009.

TECHNICAL FIELD OF THE INVENTION

The technical field of this invention is wireless telephonic and data communication.

BACKGROUND OF THE INVENTION

Figure 1:
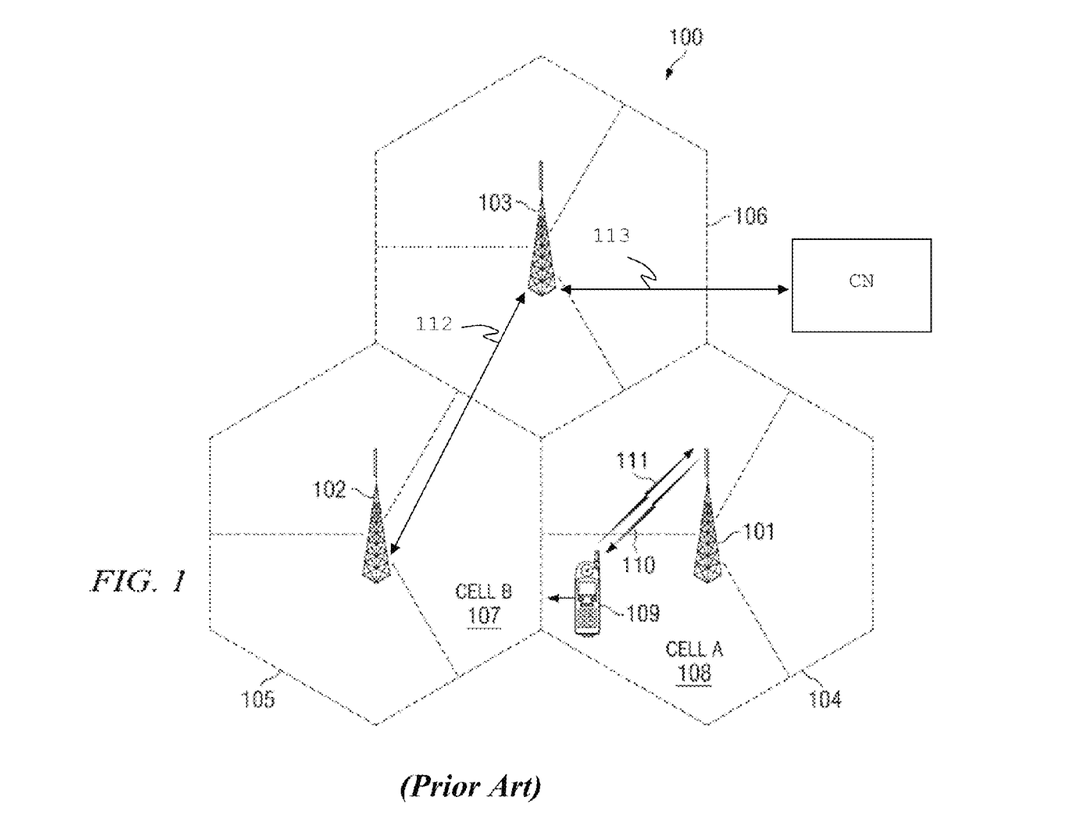
FIG. 1 is a diagram of a communication system of the prior art related to this invention having three cells.

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. All Base stations forward and receive user data communications to/from the Core Network through a backhaul link 113, also referred to as S1 interface. Base station 101 transmits to and receives transmissions from UE 109. As UE 109 moves out of Cell A 108 and into Cell B 107, UE 109 may be handed over to base station 102. Base stations can be directly inter-connected through a backhaul link 112, also referred to as X2 interface, to enable fast handover and exchange resource management related information. Because UE 109 is synchronized with base station 101, UE 109 can employ non-synchronized random access to initiate handover to base station 102.

Non-synchronized UE 109 also employs non-synchronous random access to request allocation of up link 111 time or frequency or code resources. If UE 109 has data ready for transmission, which may be traffic data, measurements report, tracking area update, UE 109 can transmit a random access signal on up link 111. The random access signal notifies base station 101 that UE 109 requires up link resources to transmit the UEs data. Base station 101 responds by transmitting to UE 109 via down link 110, a message containing the parameters of the resources allocated for UE 109 up link transmission along with a possible timing error correction. After receiving the resource allocation and a possible timing advance message transmitted on down link 110 by base station 101, UE 109 optionally adjusts its transmit timing and transmits the data on up link 111 employing the allotted resources during the prescribed time interval.

SUMMARY OF THE INVENTION

This invention is a method for extending the coverage and/or improving the capacity of wireless communication networks comprising inserting a Relay Node (RN) in the Radio Access Network (RAN). The relay node relays the signal between the Base Station node (eNB) and the User Equipment (UE). The relay node is wirelessly connected to the base station. The base station uses the same radio access technology (RAT) for the base station to user equipment link and the base station to relay node link. The relay node uses the same radio access technology for the base station to relay node link and the relay node to user equipment link. The relay node is non-transparent and seen as base station by the user equipment.

BRIEF DESCRIPTION OF THE DRAWINGS

These and other aspects of this invention are illustrated in the drawings, in which.

DETAILED DESCRIPTION OF PREFERRED EMBODIMENTS

Figure 2:
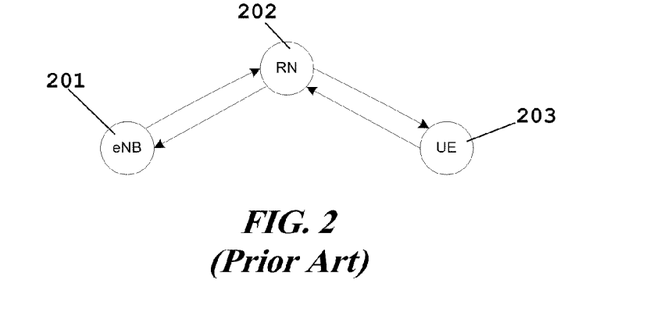
FIG. 2 illustrates an example of a 2-hop relay system.

Relay node (RN) is one of the essential elements in Long Term Evolution-Advanced (LTE-A) design of Evolved Universal Terrestrial Radio Access Network (E-UTRAN) providing coverage extension and capacity improvement of Rel-8 networks. FIG. 2 illustrates an example of a 2-hop relay system. RN 202 relays signals between Evolved Universal Terrestrial Radio Access Node B base station (eNB) 201 and UE 203. The link between eNB 201 and RN 202 is sometimes referred to as Un interface. The link between RN 202 and UE 203 is sometimes referred to as Uu interface. Such relay nodes are categorized into different classes based upon varying criteria. RN classification can be based on the available protocol stack for the user plane or control plane.

Figure 3:
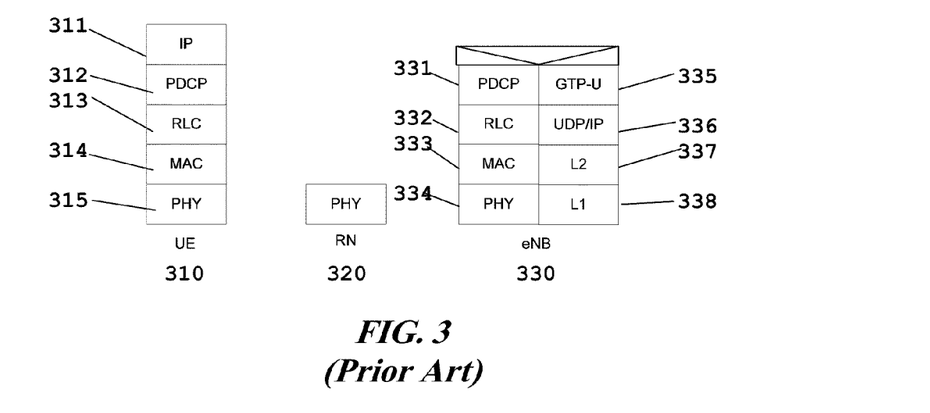
FIG. 3 illustrates the protocol layers for a relay node classified as a L0/L1 relay.
Figure 4:
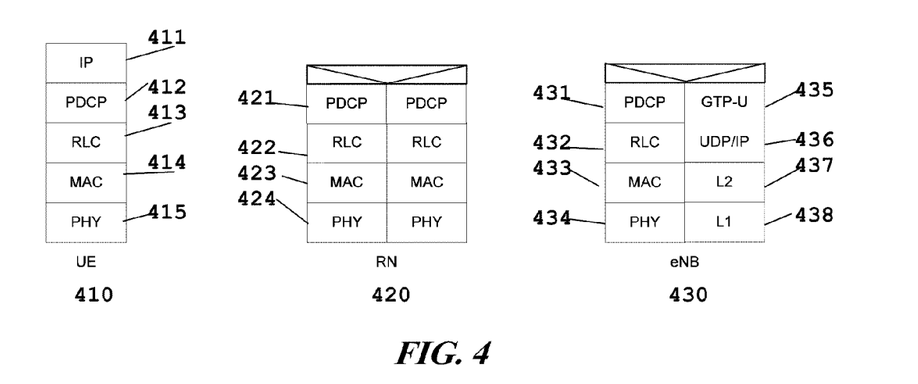
FIG. 4 illustrates the protocol layers for a relay node classified as a L2 relay.
Figure 5:
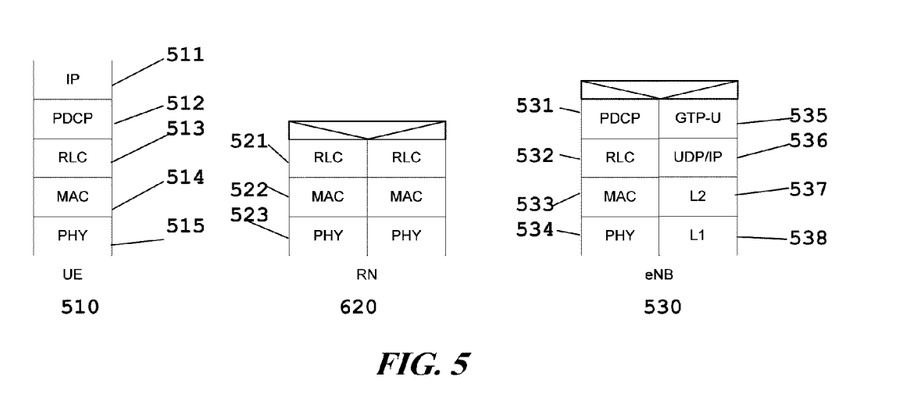
FIG. 5 illustrates the protocol layers for an alternative relay node classified as a L2 relay.
Figure 6:
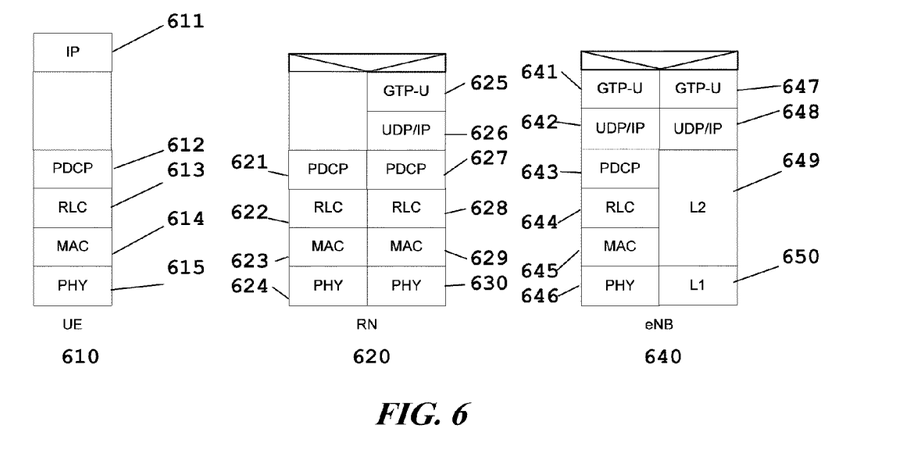
FIG. 6 illustrates the protocol layers for a relay node classified as a L3 relay.

FIGS. 3 to 6 illustrate classification of RN based on which protocol layer the user data packet is available at RN 202. FIG. 3 illustrates the user-plane protocol layers for an RN classified as a L0/L1 relay. FIGS. 4 and 5 illustrate the user-plane protocol layers for an RN classified as a L2 relay. FIG. 6 illustrates the protocol layers for an RN classified as a L3 relay.

FIG. 3 illustrates the user-plane protocol layers of an L1 relay. Protocol layers 310 of UE 203 includes Internet Protocol (IP) layer 311, Packet Data Convergence Protocol (PDCP) L2 sub-layer 312, Radio Link Control (RLC) L2 sub-layer 313, Medium Access Control (MAC) L2 sub-layer 314 and Physical layer (PHY) layer 315. Protocol layers 330 of eNB 201 includes PDCP L2 sub-layer 331, RLC L2 sub-layer 332, MAC L2 sub-layer 333 and PHY layer 334 on the UE side. Protocol layers 330 of eNB 201 includes user plane GPRS Tunneling Protocol (GTP-U) 335, User Datagram Protocol (UDP/IP) 336 and backhaul data link layers (L2/L1)

stacks 337 and 338 on the Core Network (CN) side. A L0 relay is the conventional repeater, where the received signal is amplified and forwarded in the analog front end. Strictly speaking, L0 relay does not even involve the PHY layer. L1 relays can be viewed as advanced repeaters. As illustrated in FIG. 3 protocol layer 320 of RN 202 includes only a PHY protocol layer. In RN 202 the received signal is processed by PHY layer 320. One exemplary PHY process in a L1 relay is frequency domain filtering. In this exemplary process only the useful signal is forwarded.

FIG. 4 illustrates the user-plane protocol layers of a L2 relay. Protocol layers 410 of UE 203 includes IP layer 411, PDCP L2 sub-layer 412, RLC L2 sub-layer 413, MAC L2 sub-layer 414 and PHY layer 415. Protocol layers 430 of eNB 201 similarly includes PDCP L2 sub-layer 431, RLC L2 sub-layer 432, MAC L2 sub-layer 433 and PHY layer 434 on the UE side. Protocol layers 430 of eNB 201 further includes GTP-U protocol 435, UDP/IP protocol 436 and backhaul data link layers (L2/L1) stack 437 and 438 on the CN side. In the example of a L2 relay illustrated in FIG. 4, RN 202 includes protocol layers 420. Protocol layers 420 includes PDCP L2 sub-layer 421, RLC L2 sub-layer 422, MAC L2 sub-layer 423 and PHY layer 423. An L2 relay involves protocol layers above PHY. These additional protocol layers permit advanced functions RN 202 to improve system performance. Scheduling and Hybrid Automatic Repeat Request (ARQ) (HARQ) are two important functions that are available at the L2 relay. L2 relays include at least L2 sub-MAC layer 423 in addition to PHY layer 423. In the example of FIG. 4, the L2 relay includes all L2 sub-layers and receives/forwards PDCP service data units (SDUs).

FIG. 5 illustrates the user-plane protocol layers of another embodiment of a L2 relay. Protocol layers 510 of UE 203 includes IP layer 511, PDCP L2 sub-layer 512, RLC L2 sub-layer 513, MAC L2 sub-layer 514 and PHY layer 515. Protocol layers 530 of eNB 201 include PDCP L2 sub-layer 531, RLC L2 sub-layer 532, MAC L2 sub-layer 534 and PHY layer 535 on the UE side. Protocol layers 530 of eNB 201 further includes GTP-U protocol 535, UDP/IP protocol 536 and backhaul data link layers (L2/L1) stack 537 and 538 on the CN side. In the example of a L2 relay illustrated in FIG. 5, RN 202 includes protocol layers 520. Protocol layers 520 includes RLC L2 sub-layer 521, MAC L2 sub-layer 522 and PHY layer 523. Protocol layers 520 receive and forward RLC SDUs.

FIG. 6 illustrates the protocol layers of a L3 relay. Protocol layers 610 of UE 203 includes IP layer 611, PDCP L2 sub-layer 612, RLC L2 sub-layer 613, MAC L2 sub-layer 614 and PHY layer 615. Protocol layers 640 of eNB 201 include on both RN and CN sides GTP-U protocol 641/647 and UDP/IP protocol 642/648. Protocol layers 540 of eNB 201 include at the lower levels PDCP L2 sub-layer 643, RLC L2 sub-layer 644, MAC L2 sub-layer 645 and PHY layer 546 on the RN side, and backhaul data link layers (L2/L1) stacks 649/650 on the CN side. Apart from the low layer CN backhaul functions 649/650, a L3 relay has all functions that an eNB has receiving and transmitting IP packets to its donor eNB in a similar way as if they were sent or received on the X2 interface. In the example of a L3 relay illustrated in FIG. 6, RN 202 includes protocol layers 620. Protocol layers 620 include on both UE and eNB sides a full L1 and L2 protocol stack including PDCP L2 sub-layer 621/627, RLC L2 sub-layer 622/628, MAC L2 sub-layer 623/629 and PHY layer 624/630. On the eNB side, protocol layers 520 include GTP-U protocol 625 and UDP/IP protocol 626. L3 relay receives and forwards IP packets requiring inclusion of IP layer 621 to view user pack-ets. A L3 relay has all functions that an eNB has. A L2 relay it communicates with its donor eNB through an X2-like interface.

In FIGS. 3 to 6 different relay types are classified based on at which protocol layer the U-plane data unit is visible at the relay node. Additional protocol layers may be needed for C-plane data unit for each type of relays.

The frequency band of link between eNB 201 and RN 202 may be the same or different than frequency band of the link between RN 202 and UE 203. This provides the following classifications of relay nodes: 1) in-band relay, where the link between eNB 201 and RN 202 shares the same frequency band as the link between RN 202 and UE 203; and 2) out-band relay, where the link between eNB 201 and RN 202 has a different frequency band than the link between RN 203 and UE 203. An out-band relay includes the case where the link between eNB 201 and RN 202 uses a different technology from the radio access technology, such as microwave transmissions. An in-band relay requires no additional frequency band. An out-band relay does not create additional interference since the signal on the link between eNB 201 and RN 202 uses a separate frequency band than the link between RN 202 and UE 203.

Due to implementation limitations, it is difficult for a relay node to transmit and receive on the same frequency band at the same time. Therefore, two different types of in-band relays exist: time division (TD) relays; and frequency division (FD) relays. TD relays separate the transmission and reception in the time domain. Either the transmission or the reception can occur over the whole bandwidth. TD relays require switching time between transmission and reception. FD relays separate transmission and reception in the frequency domain. Either transmission or reception can occur in all subframes. FD relays produce interference leakage between the frequency bands for transmission and reception that can degrade the system performance.

Thus there are many ways to characterize a relay node. Two types of relay nodes that are interesting to study for LTE-A.

L0/L1 relay operates on the physical layer, therefore, out-band L0/L1 relay does not seem to be reasonable. L0 relays have been deployed in existing systems. A L1 relay may incur additional processing delay. Overall, L0/L1 relays are for coverage extension. Limited specification effort is needed for L0/L1 relays.

A L2 relay can be an in-band relay or an out-band relay. An in-band L2 relay does not need to support a specific backhaul type such as microwave of fiber optic cable nor does it require any additional frequency band and associated additional Radio Frequency (RF) equipment. Thus an in-band L2 relay saves the associated operational expense (OPEX) and capital expense (CAPEX) of operating a network and potentially offers both coverage and capacity improvements. The MAC layer at the L2 relay node such as MAC layer 422 illustrated in FIG. 4 enables these system gains. For an out-band L2 relay, if the physical layer or the MAC layer on the link from eNB 201 to RN 202 does not use the same technology as the link from RN 202 to UE 203, then the out-band L2 relay serves as a bridge. This complicates implementation of RN 220. For an out-band L2 relay, if the physical layer or the MAC layer uses the same technology on both the links from eNB 201 to RN 202 and from RN 202 to UE 203, then the same air interface is required on the additional frequency band. Thus the benefit of an out-band L2 relay is not clear. Note that depending on how capable MAC layer 423 is in the L2 relay, significant specification changes may be required on both physical layer 424 and the MAC layer 423.

An L3 relay can also be in-band or out-band. An out-band L3 relay can be of interest since other communication techniques can be employed for the link from eNB 201 to RN 202 than the link from RN 202 to UE 203. For example, the L1/L2 protocol peers 630/646, 629/645, 628/644 and 627/643 of the radio link between eNB 201 to RN 202 in FIG. 6 do not necessarily need to be from the radio access technology.

In-band L3 relay does not provide any apparent gain over in-band L2 relay. An in-band L3 relay may introduce additional latency. Thus an in-band L3 relay does not offer much practical application. One merit of an L3 relay is that little specification change is required on physical layer 625/630 and the MAC layer 624/629 since the IP packet is forwarded to the eNB similar to transmission over the X2 interface.

An in-band L3 relay appears advantageous for the apparent minimum specification and implementation changes required from current LTE L2 relay protocol stack. In both L2 and L3 relay forwarding approaches, it is advantageous to aggregate all PDCP (or RLC) SDUs or GTP/UDP/IP packets of UEs of the same RN on the in-band backhaul on one transport channel or a limited number of transport channels. These signals share the same radio link at the same time. All UE data can be forwarded on the in-band backhaul using the same Modulation and Coding Scheme (MCS) and transport channel saving signalling overhead. Some differentiation may be foreseen though between UE bearers with different Quality of Service (QoS), for example regarding link adaptation. It is better for minimizing interference if backhaul transmissions, which are generally at higher power than UE transmissions, be concentrated in a packed resource rather than distributed.

For L2 relay forwarding, the RLC SDUs of different UEs are aggregated in a single backhaul RLC Protocol Data Unit (PDU) associated with a specific logical channel identifier (LCID). Such a RLC PDU will now potentially concatenate RLC SDUs generated by different PDCP entities in contrast to Rel-8. The backhaul LCID reuses the current LCID format thus not needing any particular specification. When the relay node receives an aggregated backhaul RLC Service Data Unit (SDU) from the eNB, the relay node identifies and distributes each individual RLC SDU to the appropriate LCID queues at the Downlink (DL) RLC input. Similarly, when the eNB receives an aggregated RLC SDU on the in-band backhaul from the relay node, the eNB identifies and distributes each individual RLC SDU to its appropriate PDCP entity.

Figure 7:
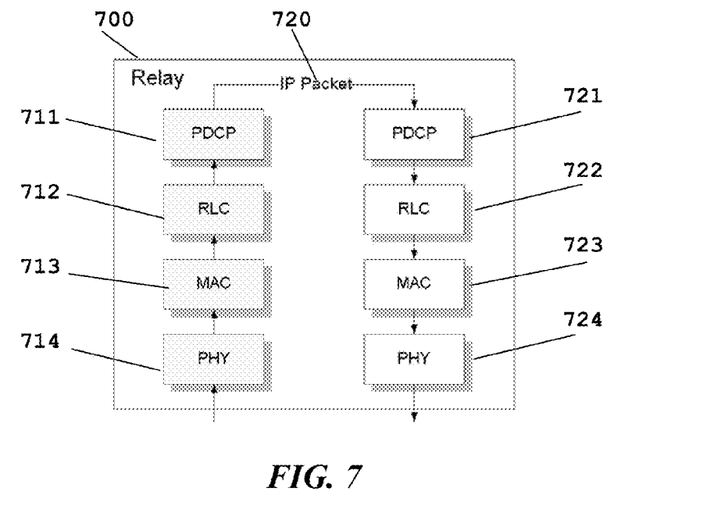
FIG. 7 illustrates a L2 relay not including a RLC layer.

FIG. 7 illustrates a L2 relay not including a RLC layer. Protocol layers 710 of UE 203 includes IP layer 711, PDCP layer 712, RLC layer 713, MAC layer 714 and PHY layer 715. Protocol layers 730 of eNB 201 similarly includes IP layer 731, PDCP layer 732, RLC layer 733, MAC layer 734 and PHY layer 735. In the example of a L2 relay illustrated in FIG. 7, RN 202 includes protocol layers 720. Protocol layers 720 includes MAC layer 421, and PHY layer 722. Without a RLC layer, a L2 relay cannot perform RLC SDU segmentation. The scheduler in the L2 relay without a RLC layer cannot choose a TBS different than the received transport block. On the other hand, it can choose different RA and MCS. Note that RLC-less L2 relay sees MAC SDUs.

More freedom is available for link adaptation in L2 relays including a RLC layer than in L2 relays not including a RLC layer. A L2 relay with a RLC layer can vary the TBS. A scheduler will typically exist in either a L2 relay with or without a RLC layer. Alternatively, the RA, MCS, and TBS on both the link between the eNB and the RN link and the link between the RN and the UE link can be made by the eNB. This if often centralized scheduling. Such centralized scheduling requires that the eNB be aware of the condition of the link between the RN and the UE to fully exploit the benefit of link adaptation. This implies direct or indirect feedback from at least one of the UE and the RN of the RN to UE channel quality to the eNB. A disadvantage of centralized scheduling is the additional latency. This latency restricts the usefulness of link adaptation. It is advantageous for L2 relays to implement: PHY-MAC-RLC protocol stack; and Uplink/Downlink (UL/DL) scheduler in MAC sublayer controlling the link between the RN and the UE. This latter condition requires that the eNB and the RN transmit a different Physical Downlink Control CHannel (PDCCH).

It is advantageous for a L2 relay to implement the Radio Resource Control (RRC) outside the relay such as in the donor eNB. This reduces the implementation complexity of the RN. Since Service Radio Bearers (SRBs) issued by the RRC need to go through the PDCP, then the PDCP should also not implemented in the L2 relay. This division of tasks results in a clean function partitioning between eNB and L2 relay.

Some arguments for implementing at least part of the RRC functionality in the L2 relay are: SRBs need to be carried in both directions on the in-band backhaul, which increases the backhaul overhead; while RRC signaling is considered slow compared to MAC signaling, some RRC procedures will slow down due to the round-trip on the in-band backhaul including RRC Connection Control, Connected Mode Mobility, and Measurements; RRC/MAC close interaction on UL and DL scheduling such as RRC managing Discontinuous Reception (DRX) states and Semipersistent Scheduling (SPS) configurations, and MAC scheduler implementing the fast scheduling. Therefore, it would be advantageous to implement at least part of the RRC functionality in the L2 relay. This would require a light PDCP dedicated to generating/processing the corresponding PDCP PDUs from/into RRC SRBs.

The UE employs random access channel (RACH) for initial UL access. The RN can use the same set of RACH parameters transmitted in Broadcast SIB2 as its donor eNB. This is a transparent RN sharing the same cell configuration as the donor eNB. Alternatively, the RN can use a different set of RACH parameters than its donor eNB. This is a non-transparent RN or transparent a RN where SIB2 ambiguity between the RN and eNB can be resolved. The following discussion will include both cases.

When the eNB and the RN use different RACH configurations, there is no ambiguity on whether the eNB or the RN receives the preamble. The eNB and the RN use different parameters such as root sequence and slots. Several options are possible to handle RACH reception by the RN. In one embodiment, the RACH procedure can be handled mostly in the RN. Thus for contention based RACH, the procedure starts with a UE transmitting a preamble sequence to the RN. The RN detects the preamble sequence, transmits an Random Access Response (RAR) to the UE, followed by a message number 3 of the RAR (Msg3) transmission and contention resolution. If the UE RACH procedure is successful, the UE obtains a Cell-Radio Network Temporary Identifier (C-RNTI) assigned by the RN. The RN communicates this C-RNTI and other information related to the UE such as the buffer state report in Msg3 to its donor eNB. This established the UE identification and pairing in the RN and the eNB. Normal data transmission follows. This embodiment requires some small modification of the RACH procedure at the RN especially for a transparent RN. Contention resolution via message number 4 of the RAR (Msg4) may not be transmitted until the UE ID is established and paired in both the RN and the eNB. Otherwise, this may cause UE ID collision if the RN and its donor eNB manage the same C-RNTI pool. One possible modification is to exclusively reserve a subset of C-RNTIs to be used by RN determined by the donor eNB.

In the alternate embodiment, the RACH procedure is partially implemented in the RN. For contention based RACH, the RN detects the preamble sequence and transmits the detected preamble sequence index to its donor eNB. The temp C-RNTI of the UE and the C-RNTI are managed and assigned solely by the eNB.

The first embodiment potentially incurs less RACH latency than the second embodiment. The first embodiment implements the complete RACH procedure at the RN resulting in lower latency. Since low accessing latency is a desirable property of RACH, the first approach is preferable.

When the eNB and the RN use the same RACH configuration, after cell search the UE sends a RACH preamble which might be detected by either the eNB or the RN or both. Upon preamble reception, either the eNB, the RN or both return the RAR. The RAR of the eNB and RN are shifted in Radio Bearers (RBs) or time during the RAR reception window. The UE only follows one detected RAR and adjusts its timing accordingly. The eNB and the RN can detect to whether the UE responds the RAR of the eNB or of the RN based on the used allocation for sending Msg3. This assumes the eNB the and RN RARs consistently use different resource allocations for Msg3. The RN performs temporary C-RNTI provisioning as previously recommended. This procedure relies on a steady UE behavior upon reception of multiple RARs during the reception window.

The design of such RN for LTE-Advanced should include the following criteria. The design should minimize specification impact. The design should minimize in-band backhaul overhead. The design should minimize RN complexity. The design should provide flexibility.

Minimizing specification impact is a main driving factor in new RN design.

Minimizing in-band backhaul overhead versus performance improvement is a key enabler of an in-band backhauled RN design. Good design may reduce performance drop up to 50%.

Minimizing RN complexity requires that the form factor of an RN is smaller than that of an eNB. This makes it advantageous to deploy a RN. Typically several RNs should be deployed at the cell edges of a donor eNB to provide significant cell-edge throughput improvement. However, the in-band backhauled L3 RN discussed above implicitly support twice as much protocol stacks as a conventional eNB. FIG. 7 illustrates the protocol layer structure of an in-band backhauled L3 RN 700. RN 700 includes PDCP layer 711, RLC layer 712, MAC layer 713 and PHY layer 714 communicating with the UE. RN 700 includes PDCP layer 721, RLC layer 722, MAC layer 723 and PHY layer 724 communicating with the eNB. IP layer 720 communicates between these two protocol layer stacks. The in-band backhauled L3 RN 700 requires these structures since it operates as a UE with respect to the donor eNB and as an eNB with respect to its serving UEs. These required structures means that the RN complexity in all other fields should be minimized to keep the overall performance gain of the network cost effective and make the RN economically viable.

Flexibility in in-band backhauling capability makes the RN described above attractive compared to other L3 relays. The RN described above saves cost and the burden of to install and maintain a backhaul or to rely on an existing backhaul such as WiFi cell site backhauled through xDSL). Therefore, it should be possible to install and move a RN of the described type in a transparent manner with respect to the network.

This patent application proposes solutions regarding options such as Un MAC, RLC and PDCP as well as the interface between the eNB and the core network (S1)/X2 termination in the light these design criteria.

Figure 8:
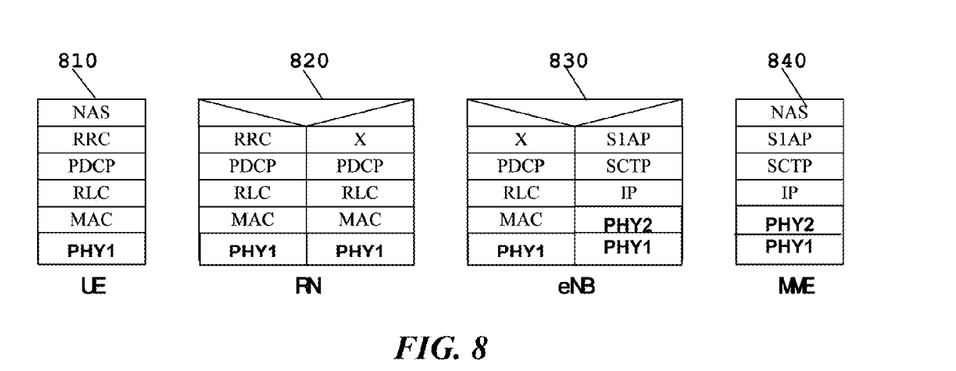
FIG. 8 illustrates the protocol stacks of an embodiment of this invention.

Regarding S1 and X2 termination, S1 Control plane (S1-C) should terminate at the donor eNB. The Core Network (CN) does not see the RN, providing the above noted flexibility in deploying and moving RN nodes without CN being aware. The existence of RN is handled within the donor eNB transparently to the CN. S1 Application Protocol (S1-AP) CN messages are terminated at the donor eNB. Non-Access Stratum (NAS) related handling of messages can be performed in the same way as an eNB does in Rel-8. FIG. 8 illustrates the resulting protocol stacks. UE 810 includes a PHY1 layer, a MAC layer, a RLC layer, a PDCP layer, a RRC layer and a NAS layer. RN 820 includes a PHY1 layer, a MAC layer, a RLC layer, a PDCP layer, a RRC layer and a NAS layer communicating with UE 810. RN 820 also includes a PHY1 layer, a MAC layer, a RLC layer, a PDCP layer, a RRC layer and an X2 layer (defined below) communicating with eNB 830. eNB 830 includes a PHY1 layer, a MAC layer, a RLC layer, a PDCP layer, a RRC layer and a NAS layer communicating with RN 820. eNB 830 also includes a PHY1 layer, a PHY2 layer, an IP layer, a Stream Control Transmission Protocol (SCTP) layer and a S1AP layer communicating with a Mobility Management Entity (MME) 840. MME 840 includes a PHY1 layer, a PHY2 layer, an IP layer, a SCTP layer, a S1 Application Protocol (S1-AP) layer and a NAS communicating with eNB 830. The X2 layer is a control plane protocol between RRC and S1-AP. Such an entity is already specified in separate layers in the Rel-8 specifications and their interface is well defined. The X2 layer specification is similar. FIG. 8 shows the complexity of the RN is minimized because the SCTP/S1-AP protocols are implemented in the donor eNB.

The same reasoning applies to the X2 interface. The X2-AP protocol should reside in the donor eNB. An LTE-A RN wirelessly connected to its donor eNB through an in-band backhaul is very unlikely to be connected to another node via an X2 interface. The handover procedure will unavoidably go through the donor eNB and its X2 interface and having X2 termination at the RN will not be advantageous.

Figure 9:
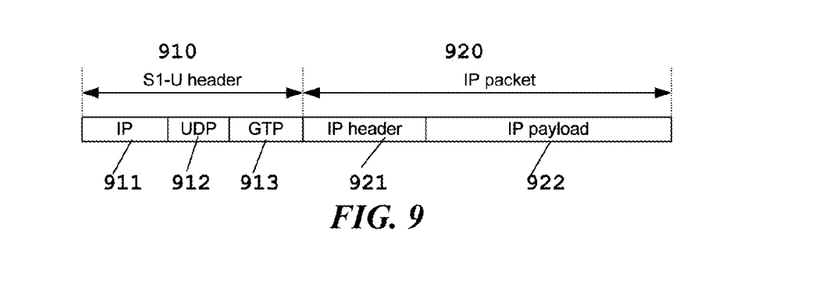
FIG. 9 illustrates the IP packet format for an embodiment of this invention.

S1 for the user plane (S1-U) and X2 for the user plane (X2-U) should terminate at donor eNB. This avoids unnecessary overhead on the in-band backhaul due to GPRS Tunneling Protocol-User plane (GTP)/User Datagram Protocol (UDP)/IP headers of IP packets. FIG. 9 illustrates the IP packet format for this case. S1-U header 910 includes IP 911, UDP 912 and GTP 913. IP packet 920 includes IP header 921 and IP payload 922.

Figure 10:
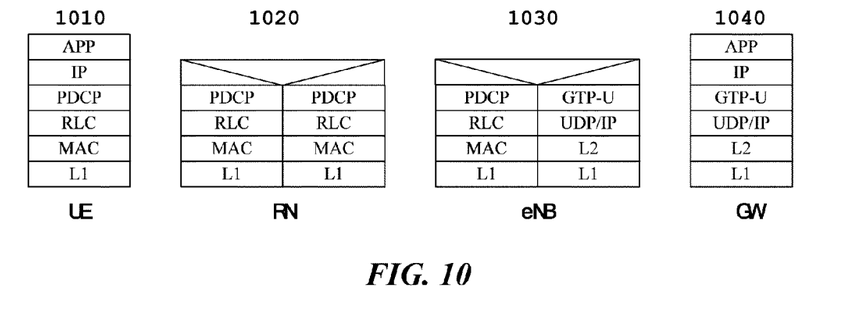
FIG. 10 illustrates the protocol stacks when the Packet Data Convergence Protocol is located in the relay node.

FIG. 10 illustrates the resulting protocol stacks when the PDCP is located in the RN. UE 1010 includes a PHY1 layer, a MAC layer, a RLC layer, a PDCP layer, a RRC layer and an application (APP) layer. RN 1020 includes a PHY1 layer, a MAC layer, a RLC layer and a PDCP layer UE 1010. RN 1020 also includes a PHY1 layer, a MAC layer, a RLC layer and a PDCP layer communicating with eNB 1030. eNB 1030 includes a PHY1 layer, a MAC layer, a RLC layer and a PDCP layer communicating with RN 1020. eNB 1030 also includes a PHY1 layer, a PHY2 layer, a combined layer UDP/IP layer communicating with GateWay (GW) 1040. GW 1040 includes a PHY1 layer, a PHY2 layer, a combined UDP/IP layer, a GTP-U layer, an IP layer and an APP layer communicating with eNB 1030. User data will be forwarded in IP level (PDCP SDU). This avoids placing a GTP/UDP/IP stack in the RN minimizing its complexity.

It is advantageous to aggregate the traffic of plural UEs of the same RN on the in-band backhaul via one single transport channel. These signals share the same radio link at the same time. Thus all UE data can be forwarded on the in-band backhaul using the same MCS and transport channel saving signalling overhead. It is better if backhaul transmissions, which will likely be at higher power than UE transmissions, be concentrated in a packed resource rather than distributed all over the place to minimize interference. Since the upper sublayer is the PDCP, this means that PDCP SDUs of different UEs are aggregated into one PDCP SDU. The IP packets of different UEs and Radio Bearers (RBs) are aggregated to form a single backhaul RB.

Figure 11:
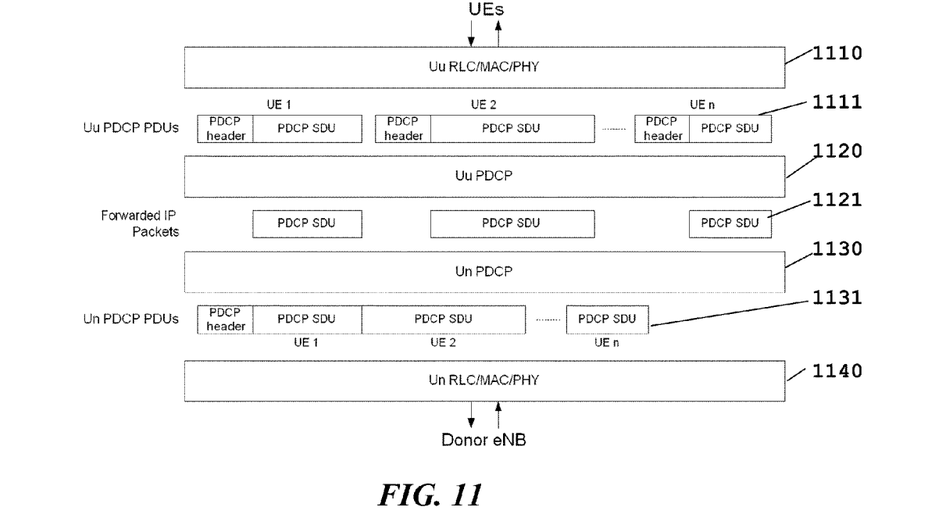
FIG. 11 illustrates the process of aggregating the traffic of plural user equipment of the same relay node on the in-band backhaul via one single transport channel.

FIG. 11 illustrates this process. The RN Uu RLC/MAC/PHY layers 1110 receive plural signals from UEs and extract plural corresponding Uu PDCP PDUs 1111, each including a header and a SDU. The RN Uu PCDP 1120 extracts and forwards corresponding IP packets 1121, each including a PDCP SDU. The RN Un PDCP 1130 forms a single Un PDCP packet 1131, which includes a PDCP header and PDCP SDU cargo corresponding to each UE transmission. The RN 1140 Un RLC/MAC/PHY layers 1140 transmit this PDU Unlike in Rel-8, Un PDCP entity will now carry the data of multiple RBs. RLC and MAC sublayers are the same as in Rel-8. We elaborate below on the PDCP sublayer.

In one embodiment, PDCP packets have their headers decompressed (de-ROHC) and decrypted, reconstituted into IP datagrams on the receiving side. Then the sending side performs Robust Header Compression (ROHC) and encryption. This raises the following issues with encryption and with the robust header. Under the current PDCP specification, when multiple UEs are aggregated in a same PDCP entity, they will be encrypted all together with the same encryption algorithm and key, associated with the backhaul RB. This might violate the security principles of an access network. Thus the Un PDCP specification 1130 of this embodiment requires support of individual UE encryption within a PDCP entity. An aggregated PDCP SDU may be formed of heterogeneous PDCP SDUs considering the ROHC contexts and profiles. Under current specification, ROHC only works on PDCP SDUs made of one IP packet with associated context and profile. Thus the Un PDCP specification 1130 of this embodiment requires support of a global ROHC on multiple PDCP SDUs with heterogeneous ROHC profiles or running header compression on each individual PDCP SDU before aggregation. In the latter case the Un PDCP 1130 is re-doing what the Uu PDCP 1120 undid (decompression) on the receive side. Thus ROHC should be simply skipped in PDCP.

In this embodiment Uu PDCP 1120 and Un PDCP 1130 should disable both encryption and decryption, and ROHC and de-ROHC at the RN. The Un PDCP 1120 and Uu PDCP 1130 sublayers in the RN should be transparent with respect to the donor eNB PDCP and its peer at the UE. This provides the following benefits. A UE encrypted PCDP PDU remains encrypted through the transparent PDCP. This presents encryption issue. ROHCed PDCP PDUs remain compressed through the transparent PDCPs. This presents no ROHC issue and the in-band backhaul overhead is minimized. Both modes are compliant with Rel-8 PDCP. This reduces the RN cost since both ROHC and crypto processing make a significant contribution to the baseband cost.

Figure 12:
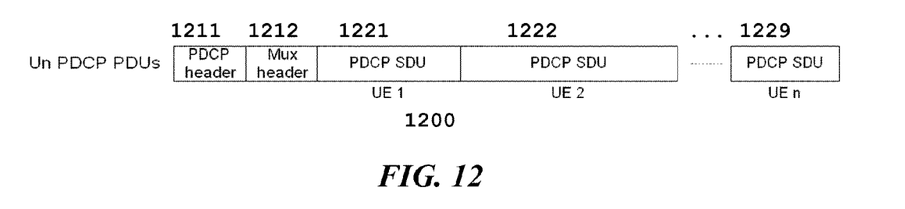
FIG. 12 illustrates the multiplexer header according to one embodiment of this invention.

When the RN receives an aggregated backhaul PDCP SDU from the eNB, the RN needs to identify and distribute each individual PDCP SDU to the appropriate Data Radio Bearer (DRB)/Signalling Radio Bearer (SRB) queues at the Downlink (DL) PDCP input. Similarly, when eNB receives an aggregated PDCP SDU on the in-band backhaul from the RN, the eNB needs be to identify and distribute each individual PDCP SDU to its appropriate GTPU tunnel on the network side. This is achieved in this invention by a multiplexing header in both the RN and the donor eNB Un PDCP 1130. FIG. 12 illustrates the resulting Un PDCP PDU 1200. Un PDCP PDU 1200 includes PDCP header 1211 and plural PDCP SDUs 1221 to 1229 as previously shown in FIG. 11. Un PDCP PDU 1200 also includes multiplexing header 1212. Multiplexing header 1212 includes information to the peer Un PDCP of the UEs identifying the corresponding UE. This information may includes RB ID, a Sequence Number (SN) and a Size. The donor eNB configures the RN with the RB ID and QoS Class Identifiers (QCI) mapping, so that QCI does not needs to be includes in the multiplexing header 1212. Since S1 terminates at the donor eNB, the RB ID to S1 bearer ID mapping remains at the donor eNB.

What is claimed is:

1. A method for extending the coverage and/or improving the capacity of wireless communication networks comprising inserting a Relay Node (RN) in Radio Access Network (RAN) where the RN relays signal between Base Station node (eNB) and User Equipment (UE), comprising the steps of:
    wirelessly connecting relay node to the eNB;
    the eNB using the same radio access technology (RAT) for the eNB-UE radio link and the eNB-Relay Node radio link;
    the relay node using the same radio access technology (RAT) for the eNB-Relay Node radio link and the Relay Node-UE radio link; and
    wherein the relay node is non-transparent and seen as an eNB by the UEs.

2. The method of claim 1, wherein:
    the Relay node has its own Cell ID.

3. The method of claim 1, wherein:
    the Relay node has its own Downlink (DL) Synchronization signals.

4. The method of claim 1, wherein:
    the Relay node has its own scheduler.

5. The method of claim 1, wherein:
    the Relay node broadcasts its own System Information.

6. The method of claim 1, wherein:
    the Relay node transmits its own Physical Downlink Control CHannel (PDCCH).

7. The method of claim 1, wherein:
    the Relay node has its own Random Access resource and implements the complete Random Access Procedure.

8. The method of claim 1, wherein:
    the Relay node runs the full L1 and L2 stack and forwards Packet Data Convergence Protocol (PDCP) Service Data Units (SDUs).

9. The method of claim 8, wherein:
    the Relay node runs a Radio Resource Control (RRC) stack.

10. The method of claim 9, wherein:
    the Relay node runs eNB to/from Core Network backhaul link Application Protocol (S1-AP) and eNB direct interconnect backhaul link Application Protocol (X2-AP) protocol stacks.

11. The method of claim 1, wherein:
    the Donor eNB terminates eNB to/from Core Network backhaul link User plane (S1-U) interface.

12. The method of claim 1, wherein:
    the Donor eNB terminates eNB direct inter-connect backhaul link User plane (X2-U) interface.

13. The method of claim 8, wherein:
eNB to/from RN link (Un) Packet Data Convergence Protocol (PDCP) multiplexes multiple IP packets from different radio bearers in a single Un PDCP Protocol Data Unit (PDU).

14. The method of claim 13, wherein:
the PDCP multiplex is unambiguously characterized by a multiplexing header providing the information of the location, identity and size of the different packets in the multiplex.

15. The method of claim 13, wherein:
each packet is identified in the PDCP multiplex by an ID field juxtaposed to the packet.

16. The method of claim 8, wherein:
eNB to/from RN link (Un) and RN to/from UE link (Uu) Packet Data Convergence Protocol (PDCP) run Robust Header Compression (ROHC) in transparent mode at the RN and ROHC runs between the eNB and the UE.

17. The method of claim 8, wherein:
eNB to/from RN link (Un) and RN to/from UE link (Uu) Packet Data Convergence Protocol (PDCP) run air interface encryption in transparent mode at the RN and air interface encryption runs between the eNB and the UE.

* * * * *